(12) United States Patent
Herbst et al.

(10) Patent No.: US 12,397,587 B2
(45) Date of Patent: Aug. 26, 2025

(54) PNEUMATIC VEHICLE TYRE

(71) Applicant: Continental Reifen Deutschland GmbH, Hannover (DE)

(72) Inventors: Stephan Herbst, Langenhagen (DE); Fabian Zimmermann, Wennigsen (DE); Stefan Rittweger, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/690,670

(22) PCT Filed: Jul. 26, 2022

(86) PCT No.: PCT/DE2022/200169
§ 371 (c)(1),
(2) Date: Mar. 8, 2024

(87) PCT Pub. No.: WO2023/036375
PCT Pub. Date: Mar. 16, 2023

(65) Prior Publication Data
US 2024/0375444 A1    Nov. 14, 2024

(30) Foreign Application Priority Data
Sep. 10, 2021   (DE) .................... 10 2021 210 022.8

(51) Int. Cl.
B60C 11/01  (2006.01)
(52) U.S. Cl.
CPC ......... B60C 11/01 (2013.01); *B60C 2011/013* (2013.01)

(58) Field of Classification Search
CPC .............. B60C 11/01; B60C 2011/0091; B60C 2011/0013
See application file for complete search history.

(56) References Cited

U.S. PATENT DOCUMENTS

2020/0376898 A1   12/2020   Yamaoka et al.

FOREIGN PATENT DOCUMENTS

| DE | 102018220707 A1 * | 6/2020 | ............. B60C 11/01 |
| EP | 3056356 A2 * | 8/2016 | ......... B60C 11/0008 |

(Continued)

OTHER PUBLICATIONS

Machine translation: DE-102018220707-A1,Behr U, (Year: 2025).*
(Continued)

*Primary Examiner* — Kendra Ly
(74) *Attorney, Agent, or Firm* — Richard A. Wolf; Gregory Adams

(57) ABSTRACT

The invention concerns a pneumatic vehicle tire having a tread and sidewalls, wherein the tread has at least one shoulder-side profile rib with a shoulder portion extending from the lateral edge of the ground contact patch of the tread in the direction of the respective sidewall and having an outer face, and containing rectangular depressions which are formed elongate transversely to the circumferential direction and are each delimited by a base and in the circumferential direction by side faces, wherein the base, viewed in cross-section transversely to the circumferential direction, has an inside base portion running towards the outer face with a maximum extent length, and an outside base portion with a maximum extent length.

16 Claims, 5 Drawing Sheets

(56) References Cited

FOREIGN PATENT DOCUMENTS

| | | | |
|---|---|---|---|
| JP | 10138713 A | * | 5/1998 |
| JP | 2000043522 A | | 2/2000 |
| JP | 2005081919 A | | 3/2005 |

OTHER PUBLICATIONS

Machine translation: JP-10138713-A, Hino H, (Year: 2025).*
PCT International Search Report dated Oct. 11, 2022 for the PCT Application No. PCT/DE2022/200169 on which this application is based.

* cited by examiner

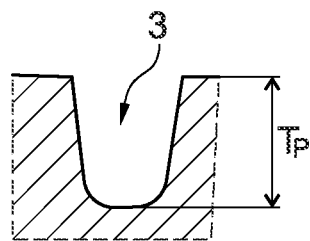
Fig. 2: II-II
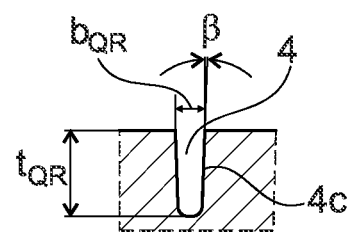
Fig. 3: III-III
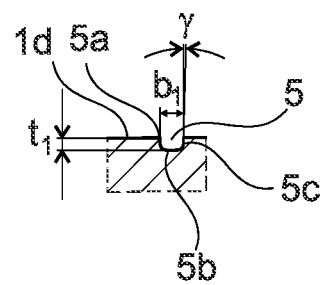
Fig. 4: IV-IV

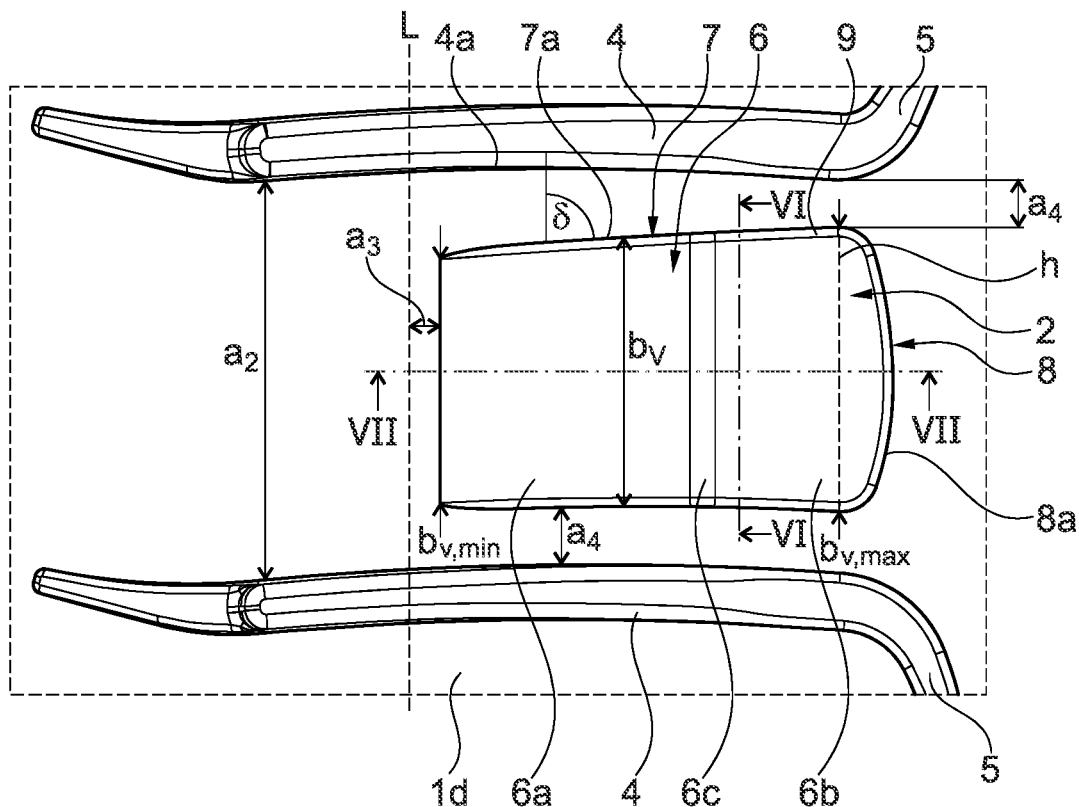
Fig. 5: Detail $Z_5$
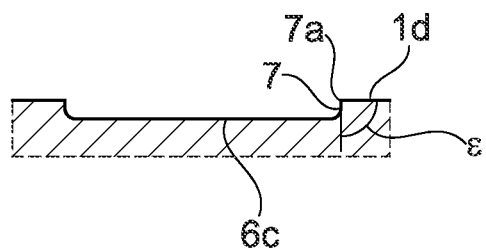
Fig. 6: VI-VI
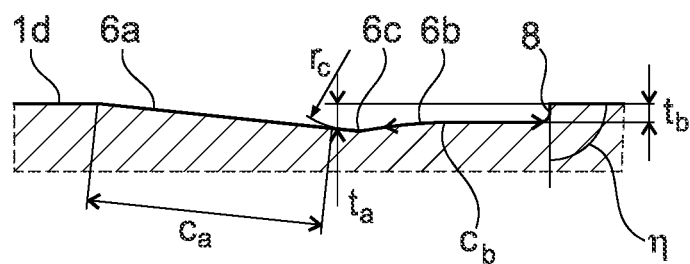
Fig. 7: VII-VII

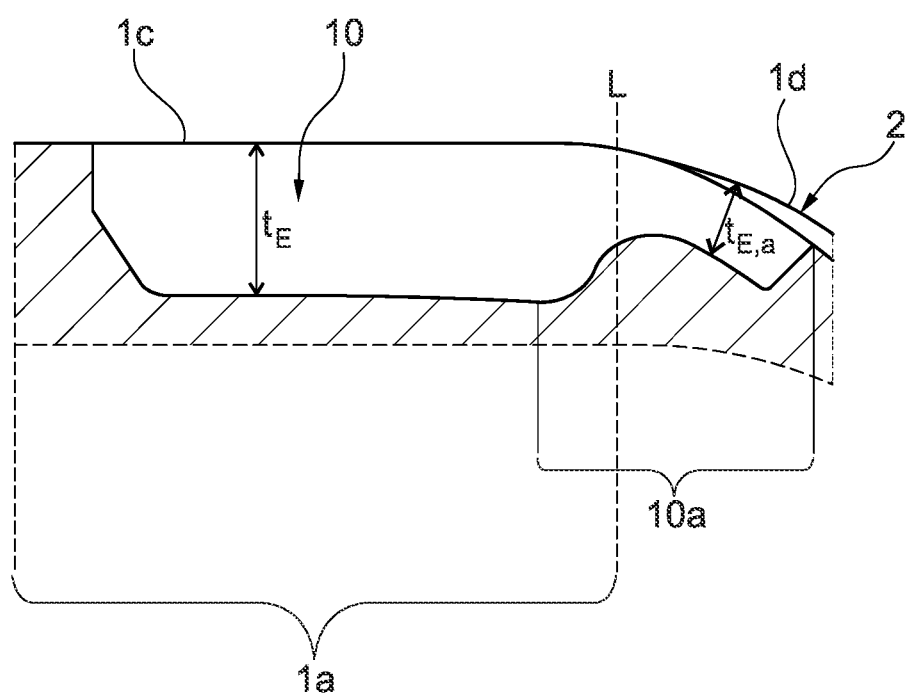
Fig. 9: IX-IX

PNEUMATIC VEHICLE TYRE

CROSS-REFERENCE TO RELATED APPLICATIONS

The present application is a National Stage Application under 35 U.S.C. § 371 of International Patent Application No. PCT/DE2022/200169 filed on Jul. 26, 2022, which claims priority from German Patent Application No. 10 2021 210 022.8 filed on Sep. 10, 2021, the disclosures of which are herein incorporated by reference in their entireties.

BRIEF SUMMARY

The invention concerns a pneumatic vehicle tire having a tread and sidewalls, wherein the tread has at least one shoulder-side profile rib with a shoulder portion extending from the lateral edge of the ground contact patch of the tread in the direction of the respective sidewall and having an outer face, and containing rectangular depressions which are formed elongate transversely to the circumferential direction and are each delimited by a base and in the circumferential direction by side faces, wherein the base, viewed in cross-section transversely to the circumferential direction, has an inside base portion running towards the outer face with a maximum extent length, and an outside base portion with a maximum extent length.

A pneumatic vehicle tire of the type mentioned above is known for example from DE 10 2018 220 707 A1. The tire has a tread with at least one shoulder-side profile rib having a shoulder portion and provided with transverse grooves, wherein rectangular depressions are formed in the shoulder portion which are elongate transversely to the circumferential direction. The depressions each have a base composed of an inside base portion and an outside base portion, wherein the outside base portion runs out in the direction towards the sidewall and the inside base portion runs at an angle of 0° to 20° to the radial direction. The base portions have a maximum extent length, viewed in cross-section transversely to the circumferential direction, wherein the maximum extent length of the inside base portion is smaller than the maximum extent length of the outside base portion, wherein the maximum extent length of the outside base portion is 10.0 mm to 30.0 mm, in particular 15.0 mm to 22.00 mm. The depressions are intended to improve the properties of traction on soft ground.

Such depressions reduce the quantity of rubber material in the shoulder portion (off-shoulder region) of the tread, and, on rolling of the tread, act on the pressure distribution (force distribution) occurring on the inner portion situated inside the ground contact patch and adjoining the shoulder portion, wherein the ground adhesion reduces and hence the force transmission to the ground may deteriorate.

The invention is therefore based on the object, in a pneumatic vehicle tire of the type cited initially, of optimizing the pressure distribution in the region of the shoulder-side profile rib while retaining the good properties of traction on soft ground.

This object is achieved according to the invention in that the maximum extent length of the outside base portion amounts to 55% to 85% of the maximum extent length of the inside base portion, wherein, in the direction towards the sidewall, the outside base portion ends at an end flank running towards the outer face of the shoulder portion and having a delimiting edge lying on the outer face of the shoulder portion, wherein the end flank, viewed in the cross-section oriented transversely to the circumferential direction, encloses an angle of 80° to 100° with the outer face of the shoulder portion.

Because of their specially designed base portions, depressions which are formed according to the invention in the shoulder portion of the profile rib, and are elongate transversely to the circumferential direction, exert significantly less influence on the pressure distribution in the inner portion of the profile rib situated inside the ground contact patch. Good properties of traction on soft ground are retained, wherein in particular the "steep" end flank facing the side wall provides a particularly stable gripping edge which is favorable for the properties of traction on soft ground.

According to a preferred embodiment, the angle which the end flank, viewed in the cross-section oriented transversely to the circumferential direction, encloses with the outer face of the shoulder portion amounts to 90° to 95°, preferably up to 92°, particularly preferably 90°. This contributes to a good stability of said gripping edge provided by the end flank, which is of additional advantage for the properties of traction on soft ground.

A further preferred embodiment, in which the shoulder-side profile rib is provided with transverse grooves, is characterized in that two transverse grooves adjacent to one another in the circumferential direction, together with an elongate groove-like depression running between the transverse grooves and in the shoulder portion, form a profile negative in the shape of a lying U when viewed in plan view and in the circumferential direction, wherein the groove-like depression has a depth of 1.0 mm to 2.0 mm. The groove-like depression or the resulting U-shaped profile negative provides additional gripping edges in the off-shoulder region, whereby the properties of traction on soft ground are further improved.

According to a further preferred embodiment, sipes are formed in the shoulder-side profile rib, in plan view running at an angle of 0° to 10° to the axial direction and extending beyond the lateral edge of the ground contact patch and having a width of 0.4 mm to 2.0 mm and a maximum depth of 70% to 100% of the profile depth, wherein the sipes each have a sipe end portion running in the shoulder portion of the profile rib, opening into a respective one of the rectangular depressions and formed more shallow than the remainder of the sipe, and with a depth, determined relative and perpendicularly to the outer face, of preferably 1.0 mm to 2.0 mm. The sipes also contribute to improving traction properties, wherein above all they improve the wet grip properties during cornering, since the water received by the sipes is favorably discharged into the rectangular depressions.

A further preferred embodiment lies in that the maximum extent length of the inside base portion amounts to 10.0 mm to 15.0 mm, in particular 11.0 mm to 14.0 mm. This is favorable above all with respect to the pressure distribution in the inner portion of the profile rib situated inside the ground contact patch.

In this context, it is furthermore advantageous if the maximum extent length of the outside base portion amounts to 60% to 80%, in particular 65% to 75%, of the maximum extent length of the inside base portion.

According to a further preferred embodiment, at its end facing the sidewall, the inside base portion has a depth, determined perpendicularly to the level of the outer face of the shoulder portion, of 1.0 mm to 2.0 mm, in particular 1.2 mm to 1.8 mm. This measure is favorable with respect to the pressure distribution in the inner portion of the profile rib situated inside the ground contact patch.

According to a further preferred embodiment, the outside base portion has a constant depth, determined perpendicularly to the level of the outer face, of 1.0 mm to 2.0 mm, in particular 1.2 mm to 1.8 mm, wherein this depth deviates preferably by maximum 0.5 mm from the depth of the inside base portion at its end facing the sidewall.

It is furthermore favorable for said pressure distribution if the rectangular depressions, at the level of the outer face, each have a width, determined in the circumferential direction, of 15.0 mm to 35.0 mm, in particular 20.0 mm to 25.0 mm.

In a shoulder-side profile rib with transverse grooves, it is additionally advantageous for said pressure distribution if the rectangular depressions, at the level of the outer face, each have a width, determined in the circumferential direction, of 55% to 80% of the distance, determined in the circumferential direction, between the transverse grooves running adjacent to the respective depression, wherein the distance is the smallest distance determined in this way.

According to a further preferred embodiment, the width of each rectangular depression increases continuously from its end lying closest to the lateral edge of the ground contact patch to its end lying closest to the sidewall.

In the latter embodiment, it is preferred if the greatest value of the width is greater by 10% to 20%, preferably by 12% to 18%, than the smallest value of the width.

A further preferred embodiment is characterized in that the base of each rectangular depression, viewed in plan view, has the form of the rectangular depression in reduced size. This is particularly advantageous for the pressure distribution occurring in the inner portion of the shoulder-side profile rib situated inside the ground contact patch.

Also, it is favorable for said pressure distribution if the inside base portion, over its circumferential extent, has a constant distance of 2.0 mm to 5.0 mm from the lateral edge of the ground contact patch.

A further preferred embodiment is characterized in that the base is composed either of the inside base portion and the outside base portion, or the base is composed of the inside base portion, the outside base portion and a middle base portion, wherein the middle base portion, viewed in the cross-section oriented transversely to the circumferential direction, runs along a radius of 4.0 mm to 6.0 mm and steadily adjoins the two other base portions.

Further features, advantages and details of the invention will now be described in more detail on the basis of the drawing, which schematically shows exemplary embodiments of the invention. In the drawing:

BRIEF SUMMARY OF DRAWINGS

FIG. 2 shows a section along line II-II of FIG. 1, FIG. 3 shows a section along line III-III of FIG. 1, FIG. 4 shows a section along line IV-IV of FIG. 1, FIG. 5 shows an enlargement of detail $Z_5$ of FIG. 1, FIG. 6 shows a section along line VI-VI of FIG. 5, FIG. 7 shows a section along line VII-VII of FIG. 5, FIG. 9 shows a section along line IX-IX of FIG. 8.

DETAILED DESCRIPTION

Pneumatic vehicle tires designed according to the invention are tires for motor vehicles, in particular for multi-track motor vehicles, and preferably tires of radial design for cars, vans, light trucks (small goods vehicles GVW≤3.5 t, lightweight goods vehicles with GVW≤7.5 t) or SUVs.

Figure 1:
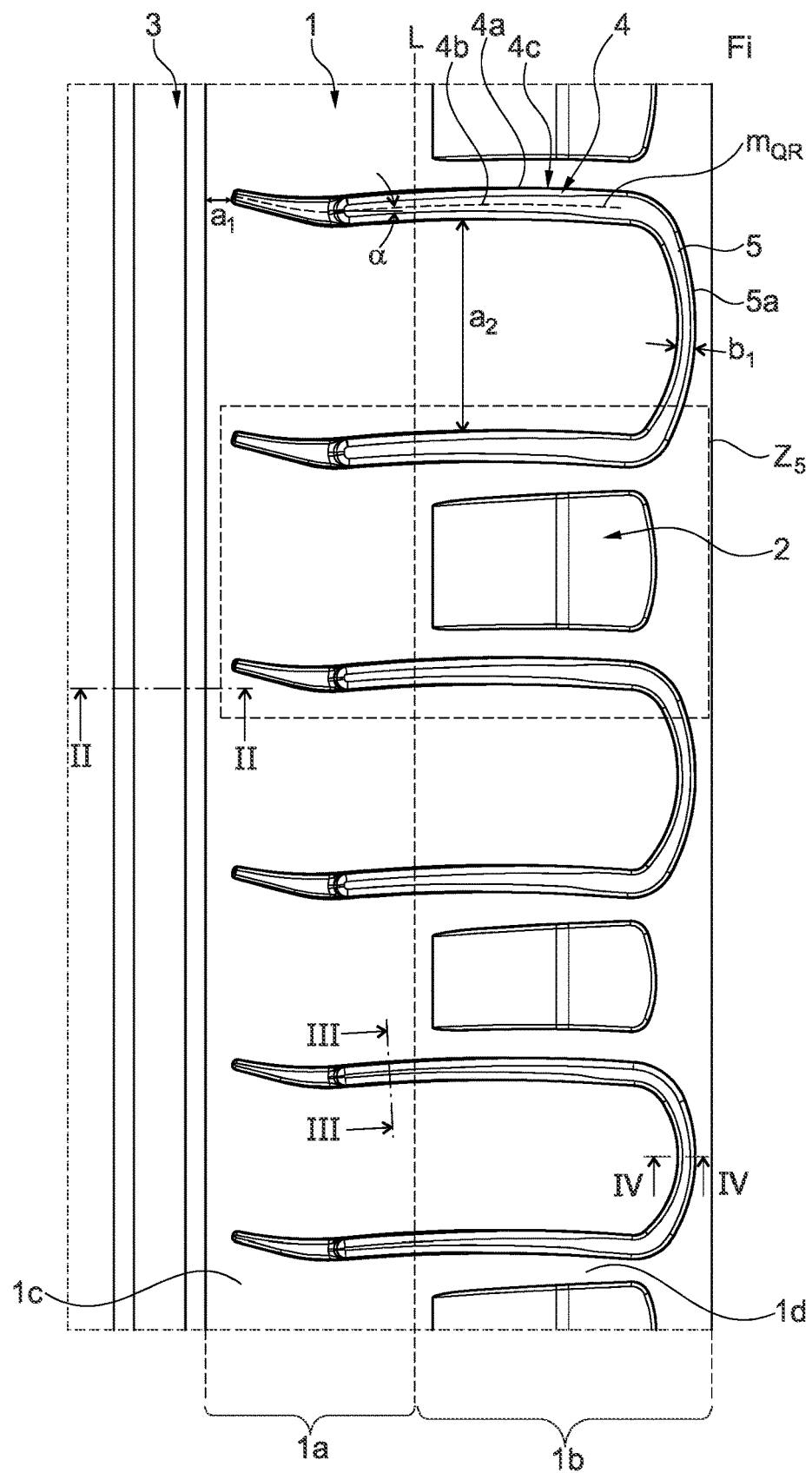
FIG. 1 shows a plan view of a shoulder-side profile rib of a tread, developed into the plane, of a pneumatic vehicle tire with a first embodiment variant of the invention.

FIG. 1 shows a top view of a circumferential portion of a shoulder-side profile rib 1 of a tread of a pneumatic vehicle tire. The lateral edge of the ground contact patch of the tread is marked by a dotted line L, wherein the ground contact patch corresponds to the statically determined footprint according to ETRTO standard (load at 70% of maximum load capacity with an internal pressure of 85% to ETRTO standard).

As will be explained in more detail, the shoulder-side profile rib 1 is provided with a number of depressions 2 which are rectangular in plan view, wherein, in the second tread shoulder (not shown), preferably a shoulder-side profile rib is provided which deviates in design from the shoulder-side profile rib 1 so that the tread has an asymmetric design in relation to the tire equatorial plane. The pneumatic vehicle tire is preferably mounted on a vehicle such as a car so that the shoulder-side profile rib 1 faces the vehicle inside (indicated by the letters "Fi").

The shoulder-side profile rib 1 is delimited on the tread inside by a shoulder-side circumferential groove 3, running straight in plan view in the exemplary embodiment shown, which in the radial direction extends up to the respective provided profile depth TP (FIG. 2) of usually 6.5 mm to 13.0 mm, preferably up to 10.0 mm. In the case of treads with circumferential grooves of different depths, the expression "profile depth" refers to the depth of the deepest circumferential groove(s).

The shoulder-side profile rib 1 has an inner portion 1a situated inside the ground contact patch and having an outer face 1c lying in the tread periphery, and a shoulder portion 1b situated outside the ground contact patch, running towards the sidewall (not shown) and having an outer face 1d, and is provided with a plurality of transverse grooves 4; said grooves run parallel to one another (viewed in plan view), are distributed over the tread circumference, run beyond the lateral edge of the ground contact patch (line L) and therefore are formed both in the inner portion 1a and in the shoulder portion 1b and, on the tread inside, end at a distance a1, determined on the outer face 1c in the axial direction (=direction parallel to tire axis), of for example 5.0 mm to 15.0 mm before the shoulder-side circumferential groove 3. The transverse grooves 4, viewed in plan view and relative to a groove center line mQR following the respective groove course, run at an angle α of 0° to 10° to the axial direction, wherein, in the exemplary embodiment shown, the angle α changes continuously because of a slightly curved course of the transverse grooves 4. In curved transverse grooves 4, the angle α is in each case determined relative to a tangent made locally on the groove center line mQR.

The transverse grooves 4 each have two groove edges 4a running over the two outer faces 1c, 1d, and are each delimited by a groove base 4b and two groove flanks 4c, wherein the groove flanks 4c, viewed in the cross-section running in plan view perpendicularly to the groove edges 4a, each run at an angle β (FIG. 3) of 0° to 5°, in particular of 1° to 3° to the radial direction. In the radial direction, the transverse grooves 4 have a maximum depth tQR (FIG. 3) of 70% to 100% of the profile depth TP (FIG. 2) and, at the level of the outer faces 1c, 1d, a width bQR (FIG. 3), determined as the smallest possible distance between the groove edges 4a, of 2.0 mm to 6.0 mm. Transverse grooves 4 directly following one another in the circumferential direction, relative to the mutually adjacent groove edges 4a, have mutual spacings a2 (FIG. 1), determined in the circumferential direction, of 20.0 mm to 45.0 mm, wherein the spacings a2 are the respective minimal possible distances between the respective groove edges 4a, determined in the circumferential direction.

As FIG. 1 furthermore shows, in the exemplary embodiment shown, two respective transverse grooves 4, adjacent to one another in the circumferential direction, are connected via a flat groove-like depression 5 formed in the shoulder portion 1b and running as an arc in plan view, wherein the two connected transverse grooves 4, in combination with the groove-like depression 5 connecting them, form a profile negative with a lying U-shape in plan view. According to FIG. 4, viewed in cross-section, the depression 5 is U-shaped, has two delimiting edges 5a (FIG. 1) formed on the outer face 1d, and is delimited by a base 5b and flanks 5c, wherein the flanks 5c, viewed in the cross-section running in plan view perpendicularly to the delimiting edges 5a, each run at an angle γ of 0° to 5°, in particular of 1° to 3° to the radial direction, and wherein the angle γ preferably corresponds to above-mentioned angle β (FIG. 3) of the groove flanks 4c of the transverse grooves 4. The delimiting edges 5a smoothly (steadily) adjoin the respective groove edges 4a (FIG. 1). The depression 5 has a depth t1, determined perpendicularly to the level of the outer face 1d, of 1.0 mm to 2.0 mm, and a width b1 determined as the minimum distance between the delimiting edges 5a, wherein the width b1, according to FIG. 1, at the connecting points of the depression 5 lying on the transverse grooves 4, corresponds to the width bQR (FIG. 3) present there of the transverse grooves 4, and starting from these connecting points diminishes continuously, in the direction towards the middle region of the depression 5, to a size of preferably 1.0 mm to 2.0 mm determined at the narrowest point of the depression 5.

According to FIG. 1, the above-mentioned rectangular depressions 2 are situated fully inside the shoulder portion 1b, and each lie between two transverse grooves 4 which are not connected by a groove-like depression 5, wherein the rectangular depressions 2 are spaced from the transverse grooves 4. The further design of the depressions 2 is explained below with reference to a single depression 2.

FIG. 5 shows an enlarged top view of a rectangular depression 2 and the transverse grooves 4 adjacent thereto. Viewed in plan view, the rectangular depression 2 is elongate transversely to the circumferential direction, and, relative to the circumferential direction, is situated substantially centrally between the respective transverse grooves 4, and extends into the region of the ends of the transverse grooves 4 facing the sidewall; the groove-like depressions 5 protrude beyond this in the direction towards the sidewall, so that the rectangular depression 2 has a greater distance from the respective sidewall than the groove-like depressions 5. "Rectangular" means that the corner regions of the depression 2 may be rounded, and in plan view the "sides" of the rectangle may run straight or be slightly arcuate, wherein the mutually opposite sides of the rectangle may also run non-parallel to one another. Rectangular furthermore means that a theoretical rectangular area may be constructed which runs on the outer face 1d and encases the depression 2, and takes up at least 85%, in particular at least 90% of the area of the depression 2 projected onto the outer face 1d. When viewed onto the outer face 1d, the theoretical rectangular area appears as a rectangle, wherein the area itself is curved because of the tire curvature.

The rectangular depression 2 is delimited by a base 6, in the circumferential direction by two side faces 7, and at its end on the tread outside by an end flank 8. In plan view, the base 6 has the shape of the depression 2 in slightly reduced form and, transversely to the circumferential direction, is composed of an inside base portion 6a, a middle base portion 6c and an outside base portion 6b, wherein the inside base portion 6a is situated closer to the lateral edge of the ground contact patch (line L) than the outside base portion 6b. Viewed in the cross-section oriented in the circumferential direction, the base 6 and therefore each base portion 6a, 6b, 6c runs straight and parallel to the outer face 1d of the shoulder portion 1b (FIG. 6 shows the outside base portion 6c).

According to FIG. 7, viewed in the cross-section oriented transversely to the circumferential direction, the inside base portion 6a has a constant maximum extent length ca of 10.0 mm to 15.0 mm, in particular of 11.0 mm to 14.0 mm, wherein the base portion 6a ends at a distance a3 (FIG. 5), determined transversely to the circumferential direction and constant over the circumferential extent of the base portion 6a, of 2.0 mm to 5.0 mm from the lateral edge of the ground contact patch (line L), runs out towards the outer face 1d in the direction towards the lateral edge of the ground contact patch (line L) and, at its end facing the sidewall, has a depth ta, determined perpendicularly to the level of the outer face 1d, of 1.0 mm to 2.0 mm, in particular of 1.2 mm to 1.8 mm. The depression 2 therefore, viewed in the cross-section of the tire, becomes continually deeper over the extent region of the inside base portion 6a in the direction towards the sidewall.

The outside base portion 6b, viewed in the cross-section oriented transversely to the circumferential direction, has a maximum extent length cb of 55% to 85%, in particular of 60% to 80%, preferably of 65% to 75%, of the maximum extent length ca of the inside base portion 6a, and runs at a constant depth tb, determined perpendicularly relative to the level of the outer face 1d, of 1.0 mm to 2.0 mm, in particular of 1.2 mm to 1.8 mm, wherein the depth tb deviates from the depth ta preferably by maximum 0.5 mm. The bend of the base portion 6b, visible in FIG. 7 on the inside end of the outside base portion 6b lying closest to the lateral edge of the ground contact patch (see line L in FIG. 5), is simply a consequence of the illustration method (development of tread).

The middle base portion 6c, viewed in the cross-section oriented transversely to the circumferential direction, runs as an arc along a radius rC of 4.0 mm to 6.0 mm, and is configured such that it steadily (smoothly and without edges) adjoins the base portions 6a, 6b. "Steadily adjoining" means that a tangent exists at the transition of the middle base portion 6c to the base portions 6a, 6b in said cross-section.

As FIG. 5 furthermore shows, the side faces 7 delimit the depression 2 in the circumferential direction, wherein the side faces 7, together with the inside base portion 6a, run out in the direction towards the lateral edge of the ground contact patch (line L). At the outer face 1d, the side faces 7 each have a delimiting edge 7a which, viewed in plan view, is straight or continuously slightly curved (arcuate) and runs at an angle δ to the circumferential direction of 90°±5°, in particular 90°±2°, wherein, with curved delimiting edges 7a, the angle δ is determined relative to a tangent applied locally to the respective delimiting edge 7a. Viewed in the cross-section oriented in the circumferential direction, the side faces 7 enclose with the outer face 1d an angle ε (FIG. 6) of 90° to 100°, in particular of up to 95°, particularly preferably of 90°.

The end flank 8 at the outer face 1d has a flat U-shaped delimiting edge 8a which is curved such that a theoretical line h connecting the ends of the delimiting edge 8a, viewed in plan view onto the depression 2, runs inside the depression 2, wherein the delimiting edge 8a steadily adjoins the delimiting edges 7a of the side faces 7. Viewed in the cross-section oriented in the circumferential direction, the end flank 8 encloses with the outer face 1d an angle η (FIG. 7) of 80° to 100°, in particular of 90° to 95°, preferably maximum 92°, particularly preferably of 90°.

In the exemplary embodiment shown, a transitional rounding 9 (FIG. 5) is formed between the base 6 and the side faces 7, and between the base 6 and the end flank 8; this rounding runs along both side faces 7 and the end flank 8, and, viewed in cross-section perpendicularly to the delimiting edges 7a, 8a, steadily adjoins the base 6 and the respective side face 7, or steadily adjoins the base 6 and the end flank 8.

The depression 2 has a width bV, determined between the delimiting edges 7a of the side faces 7 in the circumferential direction, of 55% to 80% of the above-mentioned distance a2 between the respective transverse grooves 4 running adjacent to the depression 2. In the exemplary embodiment shown, the width bV increases continuously from the ends of the delimiting edges 7a lying closest to the lateral edge of the ground contact patch (line L) to the ends of the delimiting edges 7a lying closest to the sidewall, so that the width bV has its smallest value bV,min of 55% to 64% of the distance a2 at the ends of the delimiting edges 7a lying closest to the lateral edge of the ground contact patch, and has its greatest value bV,max of 66% to 80% of the distance a2 at the ends of the delimiting edges 7a lying closest to the sidewall. Preferably, the greatest value bV,max is greater by 10% to 20%, in particular by 12% to 18%, than the smallest value bV,min.

Preferably, the width bV of the depression 2 is furthermore configured such that the depression 2 has a minimum distance a4, determined in the circumferential direction between the delimiting edges 7a and the groove edges 4a, of 2.0 mm to 5.0 mm from the transverse grooves 4 which are closest in the circumferential direction.

Figure 8:
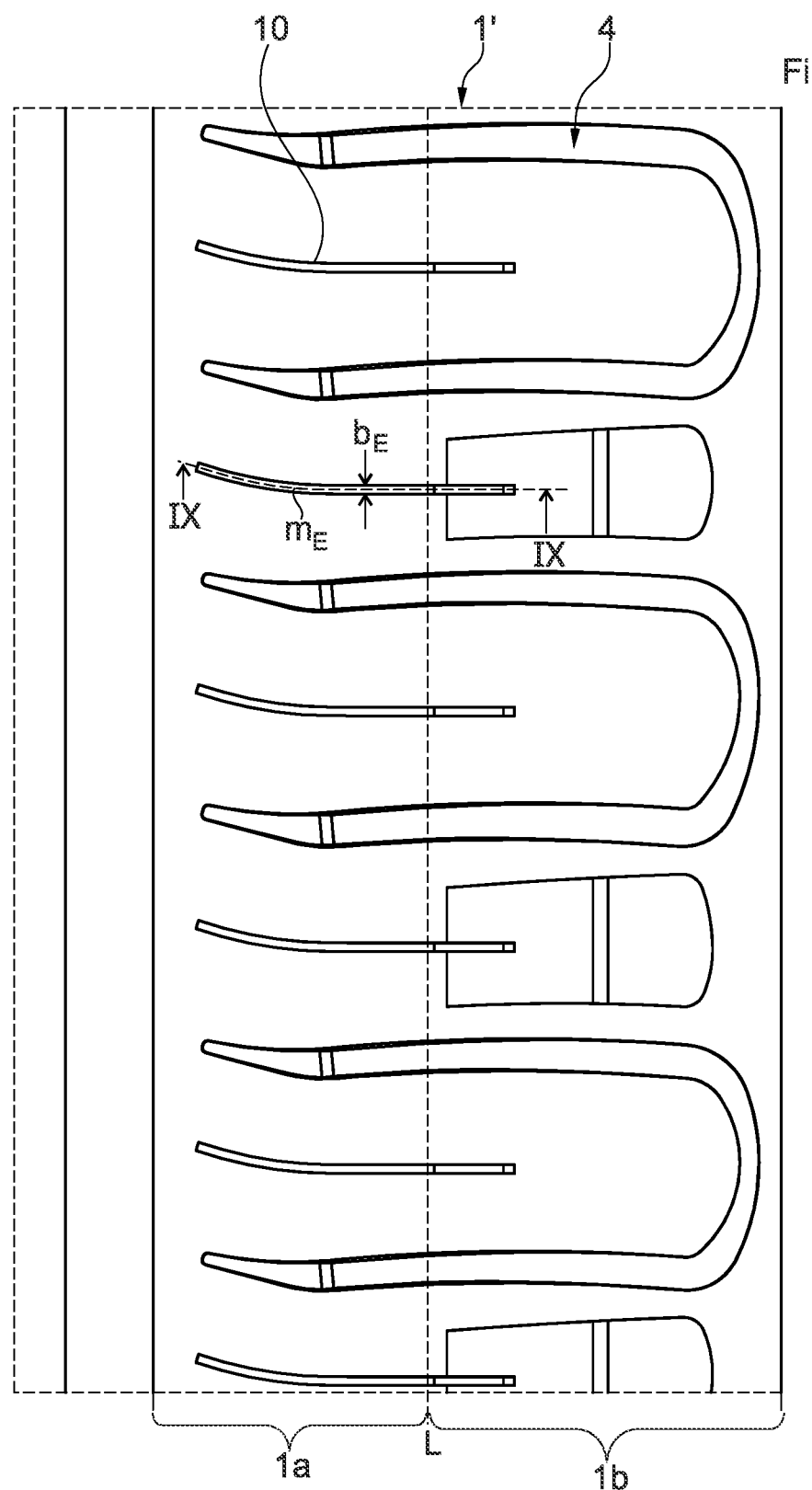
FIG. 8 shows a plan view of a shoulder-side profile rib of a tread, developed into the plane, of a pneumatic vehicle tire with a second embodiment variant of the invention.

FIG. 8 shows a top view of a shoulder-side profile rib 1' in a second embodiment variant of the invention. Similarly to the profile rib 1, the shoulder-side profile rib 1' has an inner portion 1a and a shoulder portion 1b, and differs from the shoulder-side profile rib 1 in that in each region between two transverse ribs 4, a respective sipe 10 is made with a constant width bE of 0.4 mm to 2.0 mm, in particular of up to 1.2 mm, preferably of up to 0.8 mm. Each sipe 10 runs beyond the lateral edge of the ground contact patch (line L), has a sipe center line mE which in plan view follows the sipe course (and coincides with a portion of the section line IX-IX), and, in the exemplary embodiment, in plan view, is slightly curved in portions and runs at an angle of 0 to 10° to the axial direction, wherein the angle is determined relative to a straight line which in plan view connects the ends of the sipe center line mE. According to FIG. 9, inside the inner portion 1a, the sipe 10 has a maximum depth tE (depth at the lowest point) of 70% to 100%, in particular maximum 95%, of the profile depth tP (FIG. 2) in the radial direction (i.e. perpendicularly to the level of the outer face 1c). The sipe 10 furthermore has a sipe end portion 10a which runs partly in the inner portion 1a and partly in the shoulder portion 1b (FIG. 8), and is more shallow than the remainder of the sipe 10. In the region of the depression 2, the sipe end portion 10a has a depth tE,a, determined perpendicularly to the level of the outer face 1d, of 1.0 mm to 2.0 mm.

The invention is not limited to the exemplary embodiments described.

In particular, a respective rectangular depression may be formed between two transverse ribs which directly follow one another in the circumferential direction. The tread may have a shoulder-side profile rib with rectangular depressions in each shoulder. The shoulder-side profile rib(s) with the rectangular depressions is/are preferably free of grooves or sipes opening into the adjacent shoulder-side circumferential groove. The middle base portion of the base of the rectangular depressions is optional, so that only the base portion on the tread inside and the base portion on the tread outside may form the base.

LIST OF REFERENCE DESIGNATIONS 1, 1' . . . Shoulder-side profile rib
1a . . . Inner portion
1b . . . Shoulder portion
1c . . . Outer face
1d . . . Outer face
2 . . . Rectangular depression
3 . . . Shoulder-side circumferential groove
4 . . . Transverse groove
4a . . . Groove edge
4b . . . Groove base
4c . . . Groove flank
5 . . . Groove-like depression
5a . . . Delimiting edge
5b . . . Base
5c . . . Flank
6 . . . Base
6a . . . Inside base portion
6b . . . Outside base portion
6c . . . Middle base portion
7 . . . Side face
7a . . . Delimiting edge
8 . . . End flank
8a . . . Delimiting edge
9 . . . Transitional rounding
10 . . . Sipe
10a . . . Sipe end portion
$a_1, a_2, a_3$ . . . Distance
$a_4$ . . . Minimum distance
$b_1, b_E, b_{QR}, b_V$ . . . Width
$b_{V,min}$ . . . Smallest value
$b_{V,max}$ . . . Greatest value
$c_a, c_b$ . . . Maximal extent length
h . . . Help line
L . . . Line (lateral edge of ground contact patch)
Fi . . . Vehicle inside
$m_E$ . . . Sipe center line
$m_{QR}$ . . . Groove center line
$r_C$ . . . Radius
$t_1, t_a, t_b, t_{QR}, t_{E,a}$ . . . Depth
$t_E$ . . . Maximum depth
$T_P$ . . . Profile depth
$Z_5$ . . . Detail
α, β, γ, δ, ε, η . . . Angle

The invention claimed is:

1. A pneumatic vehicle tire comprising:
   a tread;
   sidewalls;
   a shoulder-side profile rib of the tread, the rib having a shoulder portion extending from a lateral edge (L) of the ground contact patch of the tread in the direction of the respective sidewall and having an outer face, and rectangular depressions formed elongate transversely to a circumferential direction;
   each of the rectangular depressions are delimited by a base and in the circumferential direction by side faces, the base, viewed in cross-section transversely to the circumferential direction, has an inside base portion running towards the outer face with a maximum extent length ($c_a$), and an outside base portion with a maximum extent length ($c_b$);
   wherein the maximum extent length ($c_b$) of the outside base portion amounts to 55% to 85% of the maximum extent length ($c_a$) of the inside base portion;
   wherein, in the direction towards the sidewall, the outside base portion ends at an end flank running towards the outer face of the shoulder portion and having a delimiting edge lying on the outer face of the shoulder portion;
   wherein the end flank, viewed in the cross-section oriented transversely to the circumferential direction, encloses an angle ($\eta$) of 80° to 100° with the outer face of the shoulder portion, and
   wherein the base includes the inside base portion, the outside base portion, and a middle base portion, wherein the middle base portion, viewed in cross-section oriented transversely to the circumferential direction, has a concave surface that adjoins the inside and outside base portions, and wherein the maximum extent length ($c_b$) of the outside base portion is measured from an end edge of the outside base portion to the concave surface of the middle base portion, and the maximum extent length ($c_a$) of the inside base portion is measured from an end edge of the inside base portion to the concave surface of the middle base portion.

2. The pneumatic vehicle tire of claim 1, wherein the angle ($\eta$) which the end flank (8), viewed in the cross-section oriented transversely to the circumferential direction, encloses with the outer face (1$d$) of the shoulder portion (1$b$), amounts to 90° to 95°.

3. The pneumatic vehicle tire of claim 1, wherein the shoulder-side profile rib (1, 1') is provided with transverse grooves (4), wherein two transverse grooves (4) adjacent to one another in the circumferential direction, together with an elongate groove-like depression (5) running between the transverse grooves (4) and in the shoulder portion (1$b$), form a profile negative in the form of a lying U, viewed in plan view and in the circumferential direction, wherein the groove-like depression (5) has a depth ($t_1$) of 1.0 mm to 2.0 mm.

4. The pneumatic vehicle tire of claim 1, wherein sipes (10) are formed in the shoulder-side profile rib (1'), in plan view running at an angle of 0° to 10° to the axial direction and extending beyond the lateral edge (line L) of the ground contact patch and having a width ($b_E$) of 0.4 mm to 2.0 mm and a maximum depth ($t_E$) of 70% to 100% of the profile depth ($T_P$), wherein the sipes (10) each have a sipe end portion (10$a$) running in the shoulder portion (1$b$) of the profile rib (1'), opening into a respective one of the rectangular depressions (2) and formed more shallow than the remainder of the sipe (10), and with a depth ($t_{E,a}$), determined relative and perpendicularly to the outer face (1$d$), of 1.0 mm to 2.0 mm.

5. The pneumatic vehicle tire of claim 1, wherein the maximum extent length ($c_a$) of the inside base portion (6$a$) amounts to 10.0 mm to 15.0 mm.

6. The pneumatic vehicle tire of claim 1, wherein the maximum extent length ($c_b$) of the outside base portion (6$b$) amounts to 60% to 80% of the maximum extent length ($c_a$) of the inside base portion (6$a$).

7. The pneumatic vehicle tire of claim 1, wherein at its end facing the sidewall, the inside base portion (6$a$) has a depth ($t_a$), determined perpendicularly to the level of the outer face (1$d$) of the shoulder portion (1$b$), of 1.0 mm to 2.0 mm.

8. The pneumatic vehicle tire of claim 1, wherein the outside base portion (6$b$) has a constant depth ($t_b$), determined perpendicularly to the level of the outer face (1$d$), of 1.0 mm to 2.0 mm, wherein this depth ($t_b$) deviates by maximum 0.5 mm from the depth ($t_a$) of the inside base portion (6$a$) at its end facing the sidewall.

9. The pneumatic vehicle tire of claim 1, wherein the rectangular depressions (2), at the level of the outer face (1$d$), each have a width ($b_V$), determined in the circumferential direction, of 15.0 mm to 35.0 mm.

10. The pneumatic vehicle tire of claim 1, wherein the shoulder-side profile rib (1, 1') is provided with transverse grooves (4), wherein the rectangular depressions (2), at the level of the outer face (1$d$), each have a width ($b_V$), determined in the circumferential direction, of 55% to 80% of the distance ($a_2$), determined in the circumferential direction, between the transverse grooves (4) running adjacent to the respective depression (2), wherein the distance ($a_2$) is the smallest distance determined in this way.

11. The pneumatic vehicle tire of claim 1, wherein the width ($b_V$) of each rectangular depression (2) increases continuously from its end lying closest to the lateral edge of the ground contact patch (line L) to its end lying closest to the sidewall.

12. The pneumatic vehicle tire of claim 1, wherein the greatest value ($b_{V,max}$) of the width ($b_V$) is greater by 10% to 20% than the smallest value ($b_{V,min}$) of the width ($b_V$).

13. The pneumatic vehicle tire of claim 1, wherein the inside base portion (6$a$) over its circumferential extent has a constant distance ($a_3$) of 2.0 mm to 5.0 mm from the lateral edge (line L) of the ground contact patch.

14. The pneumatic vehicle tire of claim 1, wherein, when viewed in cross-section oriented transversely to the circumferential direction, the inside base portion is inclined relative to the outside base portion and has a continuous incline along its entire maximum extent length ($c_a$).

15. A pneumatic vehicle tire comprising:
   a tread;
   sidewalls;
   a shoulder-side profile rib of the tread, the rib having a shoulder portion extending from a lateral edge (L) of the ground contact patch of the tread in the direction of the respective sidewall and having an outer face, and rectangular depressions formed elongate transversely to a circumferential direction;
   each of the rectangular depressions are delimited by a base and in the circumferential direction by side faces, the base, viewed in cross-section transversely to the circumferential direction, has an inside base portion running towards the outer face with a maximum extent length ($c_a$), and an outside base portion with a maximum extent Length ($c_b$);

wherein the maximum extent length ($c_b$) of the outside base portion amounts to 55% to 85% of the maximum extent length ($c_a$) of the inside base portion;

wherein, in the direction towards the sidewall, the outside base portion ends at an end flank running towards the outer face of the shoulder portion and having a delimiting edge lying on the outer face of the shoulder portion;

wherein the end flank, viewed in the cross-section oriented transversely to the circumferential direction, encloses an angle ($\eta$) of 80° to 100° with the outer face of the shoulder portion, and wherein:

the base is composed of the inside base portion, the outside base portion, and a middle base portion, wherein the middle base portion, viewed in the cross-section oriented transversely to the circumferential direction, runs along a radius ($r_c$) of 4.0 mm to 6.0 mm and steadily adjoins the two other base portions.

16. A pneumatic vehicle tire comprising:

a tread;

sidewalls;

a shoulder-side profile rib of the tread, the rib having a shoulder portion extending from a lateral edge (L) of the ground contact patch of the tread in the direction of the respective sidewall and having an outer face, and rectangular depressions formed elongate transversely to a circumferential direction;

each of the rectangular depressions are delimited by a base and in the circumferential direction by side faces, the base, viewed in cross-section transversely to the circumferential direction, has an inside base portion running towards the outer face with a maximum extent length ($c_a$), and an outside base portion with a maximum extent length ($c_b$);

wherein the maximum extent length ($c_b$) of the outside base portion amounts to 55% to 85% of the maximum extent length ($c_a$) of the inside base portion;

wherein, in the direction towards the sidewall, the outside base portion ends at an end flank running towards the outer face of the shoulder portion and having a delimiting edge lying on the outer face of the shoulder portion;

wherein the end flank, viewed in the cross-section oriented transversely to the circumferential direction, encloses an angle ($\eta$) of 90° to 95° with the outer face of the shoulder portion;

wherein the shoulder-side profile rib is provided with transverse grooves having two transverse grooves adjacent to one another in the circumferential direction, together with an elongate groove-like depression running between the transverse grooves and in the shoulder portion, form a profile negative in the form of a lying U, viewed in plan view and in the circumferential direction; and wherein the groove-like depression has a depth ($t_1$) of 1.0 mm to 2.0 mm.

* * * * *